United States Patent
Kuroda et al.

(10) Patent No.: US 6,785,445 B2
(45) Date of Patent: Aug. 31, 2004

(54) NEAR FIELD LIGHT PROBE, NEAR FIELD OPTICAL MICROSCOPE, NEAR FIELD LIGHT LITHOGRAPHY APPARATUS, AND NEAR FIELD LIGHT STORAGE APPARATUS THAT HAVE THE NEAR FIELD LIGHT PROBE

(75) Inventors: Ryo Kuroda, Kanagawa (JP); Takako Yamaguchi, Kanagawa (JP); Yasuhisa Inao, Kanagawa (JP); Tomohiro Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 10/107,447

(22) Filed: Mar. 28, 2002

(65) Prior Publication Data

US 2002/0154859 A1 Oct. 24, 2002

(30) Foreign Application Priority Data

Mar. 30, 2001 (JP) ........................................ 2001-098322

(51) Int. Cl.[7] ................................................ G02B 6/26
(52) U.S. Cl. ........................... 385/38; 385/43; 385/117; 385/118
(58) Field of Search ............................ 385/38, 43, 31, 385/117, 118

(56) References Cited

U.S. PATENT DOCUMENTS 5,677,978 A      10/1997  Lewis et al.
5,859,814 A  *   1/1999  Kino et al. ............... 369/13.33
6,156,215 A     12/2000  Shimada et al.
6,201,226 B1    3/2001   Shimada et al.
6,229,609 B1    5/2001   Muramatsu et al.
6,376,833 B2    4/2002   Shimada et al.
6,408,123 B1    6/2002   Kuroda et al.

FOREIGN PATENT DOCUMENTS

JP    07-174542    7/1995
JP    10-293134   11/1998
JP    11-064350    3/1999
JP    11-066650    3/1999

* cited by examiner

Primary Examiner—Hemang Sanghavi
Assistant Examiner—Sung Pak
(74) Attorney, Agent, or Firm—Fitzpatrick, Cella, Harper & Scinto

(57) ABSTRACT

A near field light probe is capable of emanating a near field light having a sufficient intensity while allowing reduction of aperture size to improve resolution. The near field light probe can be incorporated in a near-field optical microscope, a near field light lithography apparatus, and a near field light storage apparatus. A near field light probe has a configuration in which a light-blocking film is formed with an aperture having slits surrounding the major opening. Light emitted from a light source is coupled into the probe from one side of the light-blocking film, the light being polarized in a predetermined direction with respect to the slits so that a near field light emanates from the major opening.

11 Claims, 11 Drawing Sheets

NEAR FIELD LIGHT PROBE, NEAR FIELD OPTICAL MICROSCOPE, NEAR FIELD LIGHT LITHOGRAPHY APPARATUS, AND NEAR FIELD LIGHT STORAGE APPARATUS THAT HAVE THE NEAR FIELD LIGHT PROBE

BACKGROUND OF THE INVENTION

1. Field of the Invention

The present invention relates to a near field light probe having a resolution equal to or less than a wavelength of light, a near field optical microscope, a near field light lithography apparatus, and a near field light storage apparatus that have the near field light probe.

2. Related Background Art

Advances in micro-fabrication of microscopes, machining apparatuses, and storage apparatuses that use light will require resolutions of 100 nm or less in the future. Such microscopes are used in the fields of micro-fabrication-oriented biotechnology such as IVF-ET (In Vitro Fertilization and Embryo Transfer) and gene therapy. The photolithography apparatuses are used for manufacturing semiconductor memories that store a large amount of information such as information from the internet and high resolution video images available in an information society. The storage apparatus includes a large-capacity optical disk.

High resolution of the apparatus using light has been developed in the past by increasing NA of lens and employing light sources of shorter wavelengths. However, this approach places limitations on the development of apparatuses having still higher resolution. In order to overcome this technical limitation, use of near field light optics without using a lens is beginning to receive more attention. Near field light provides a resolution independent of the wavelength of light, and achieves high resolution that overcomes limitations due to diffraction. A near field optical microscope based on near field light has been developed. The development of a machining apparatus and a storage apparatus that employ the near field optical microscope is in progress.

The aforementioned near field optical microscope has an optical probe formed of a sharply pointed optical fiber that is enclosed with a light-blocking metal film having an aperture of about 100 nm formed in the tip of the light-blocking metal film. Light is coupled into the optical fiber from behind the aperture so that the near field light penetrates through the aperture out of the fiber to illuminate an object under test. The light reflected from or transmitted through the object is detected, thereby allowing observation of the surface condition of the object with a resolution as high as the size of the aperture (Japanese Patent Application Laid-Open No. 7-174542 and U.S. Pat. No. 5,677,978).

The resolution of the aforementioned probe is determined by the size of the aperture. In order to further increase resolution, the aperture is required to be made smaller. However, a smaller aperture, decreases the intensity of the near field light that has penetrated through the aperture. If the resolution of the near field optical microscopes is to be improved, the intensities of reflected light and transmitted light detected near field light after reflection or transmission decrease, and therefore the SN ratio of the detection signal deteriorates. Therefore a smaller aperture suffers from the problem that observation under a microscope is a time consuming work.

With a machining apparatus using the optical probe, if the aperture is made smaller in an attempt to perform micromachining, the amount of transmitted light decreases, machining time becomes longer, and throughput is decreased. With an optical storage apparatus using the optical probe, if the aperture is made smaller for implementing a larger memory capacity, time required for recording and reproducing data becomes longer.

An object of the present invention is to provide a near field light probe that can offer near field light of a sufficient intensity even if the aperture is made smaller in an attempt to improve resolution, and a near field optical microscope, a near field light lithography apparatus, and a near field light storage apparatus that have the aforementioned near field light probe.

SUMMARY OF THE INVENTION

In order to solve the aforementioned subjects, the present invention provides a near field optical microscope, a near field light lithography apparatus, and a near field light storage apparatus that employ a near field light probe. The near field light probe is characterized in that a light-blocking film has an aperture comprised of slits formed around a major opening, which means a portion of the aperture other than the slits, and light emitted from a light source is polarized in a predetermined direction and then introduced into the slits of the aperture from one side of the light-blocking film, thereby causing near field light to emanate from the aperture.

According to an aspect of the present invention, there is provided a near field light probe wherein a light-blocking film has an aperture comprised of a major opening and slits surrounding the major opening, and light emitted from a light source and polarized in a specific direction of oscillation of electric field vector comes into the aperture from one side of the light-blocking film, whereby a near field light usable for probing emanates from the major opening.

Each of the slits in the present invention may have a width substantially at most the same as a dimension of the major opening.

The longitudinal directions of the slits in the present invention may be either parallel to or at an acute angle with the specific direction of the oscillation of the electric field vector.

The aperture in the present invention may have a substantial cross shape, the crossing of which cross shape is the major opening, and the longitudinal directions of slits of the aperture in the present invention may make about 45-degree angles with the specific direction of the oscillation of the electric field vector, respectively. In this embodiment, the major opening may have a smaller dimension in the specific direction of the oscillation of the electric field vector than a dimension of the major opening in the direction making a right angle with the specific direction.

The aperture in the present invention may have a substantial H-shape the bar of which H-shape is the major opening, and the light polarized in the specific direction of the oscillation of the electric field vector is a light polarized in the longitudinal direction of the H-shape. In this embodiment, the slits that form the H-shape may be located so as to make the distance between two of the slits adjacent to each other increases with increasing a distance from the center of the H-shape.

The aperture in the present invention may be provided at a sharply pointed tip portion of an optical waveguide covered with the light-blocking film. In this embodiment, the sharply pointed tip portion of the optical waveguide covered with the light-blocking film may have a shape of a pyramid, and the slits may be substantially aligned with edges of the pyramid.

The light-blocking film in the present invention may be flat and the aperture may be formed in the light-blocking film. In this embodiment, a plurality of the apertures may be formed in the light-blocking film.

The probe in the present invention may be provided on an elastic body.

According to another aspect of the present invention, there is provided a near field optical microscope incorporating the near field light probe of the present invention.

According to a further aspect of the present invention, there is provided a near field light lithography apparatus incorporating the near field light probe of the present invention.

According to a further aspect of the present invention, there is provided a near field light storage apparatus incorporating the near field light probe of the present invention.

BRIEF DESCRIPTION OF THE DRAWINGS

In the figures, a symbol "⊙" showing the direction of a coordinate axis means that the direction of the axis is from the reverse side of the paper to the front side thereof. A symbol "⊗" means the direction from the front side to the reverse side.

DESCRIPTION OF THE PREFERRED EMBODIMENTS

Figure 1A:
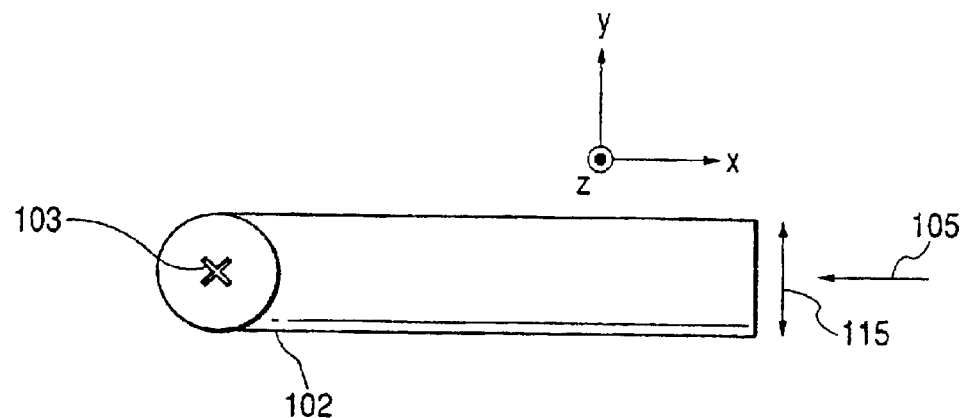
FIGS. 1A and 1B illustrate the configuration of a near field light probe according to a first embodiment if the present invention.

As mentioned above, in the present invention, a major opening has a size according to a predetermined resolution and slits are formed to surround the major opening. The slit has a width equal to or less than a diameter of the major opening (aperture diameter hereinafter) and extends from the periphery of the major opening in a direction parallel to or at an acute angle with a direction of oscillation of the electric field vector of the incident light linearly polarized. The slits may extend radially from the major opening or in a direction parallel to the electric field vector oscillation of the incident light. The major opening can be of conventional shapes such as circular, elliptic, or rectangular. Thus, as mentioned below, the overall shape of the aperture includes a cross-shape and an H-shape and modifications of these shapes having slits of different widths or directions. When the near field light probe is applied to optical microscopes, lithography apparatuses, or storage apparatuses, a predetermined area is defined to be exposed to the near field light in accordance with a predetermined resolution, and the size of a corresponding aperture is determined. A conventional aperture is usually circular but may be elliptic or rectangular in some cases. In the present invention, the aperture that illuminates the predetermined area has slits comprised therein. If the width of the slit is too large, the intensity of the near field light is too high, so that the near field light illuminates not only the predetermined area but also an area around it. In the present invention, the slit width is selected to be substantially at most the same as the major opening through which the light illuminates the predetermined area, thereby not increasing the intensity of the near field light that passes through the slit but increasing the intensity of only the near field light that illuminates a predetermined area. The direction of the slit is such that a longitudinal direction of the slit is parallel to or at an acute angle with the electric field vector oscillation direction of the polarized light from the light source, at the major opening. An electric field induced by the electric field of the incident light is increased in intensity at a crossing point of the slits so that the near field light in a predetermined area increases in intensity.

As described above, in the present invention, a near field light illuminating the predetermined area is used as a probe light of microscopes or information recording-reproducing apparatuses; or as an exposing or recording light of exposing apparatuses or information recording-reproducing apparatuses. (In the present specification, the terms "probe" and "probing" may be used as terms concerning recording as well as detecting.) The size and shape of the major opening is designed according to the predetermined area to determine an area to be illuminated with the near field light the major opening of which is available for probing. On the other hand, the width of the slit is designed so as to have at most the same measure as the major opening so that the slit can irradiate only an extremely faint near field light the intensity of which is substantially zero as a probe light or a recording light and therefore does not function for probing. It is near field light from the major opening that can be effectively used for the probing.

The present invention is capable of producing a near field light having a much higher intensity than the conventional circular aperture having the same resolution. Therefore, the opening can be made smaller in an attempt to improve resolution while still providing a sufficient intensity of near field light. For this reason, increasing the resolution of a near field optical microscope will not decrease the intensity of the light reflected from an object, the intensity of the light transmitted through the object, and the SN ratio of the detection signal, and allow observation of the object under the microscope in a short time.

With a machining apparatus to which the optical probe is applied, decreasing the size of the opening in an attempt to perform ultra micromachining will not decrease the amount of light transmitted through an object, thereby shortening time required for machining and increasing throughput. With an optical storage apparatus to which the optical probe is applied, decreasing the size of the opening in an attempt to increase storage capacity will still allows high speed recording and reproducing.

Figure 3A:
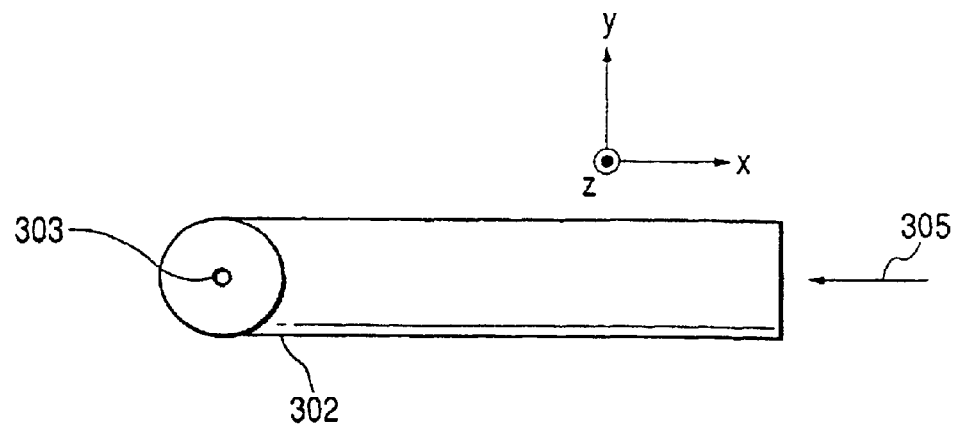
FIGS. 3A and 3B illustrate a configuration of prior art near field light probe having a circular aperture.
Figure 3B:
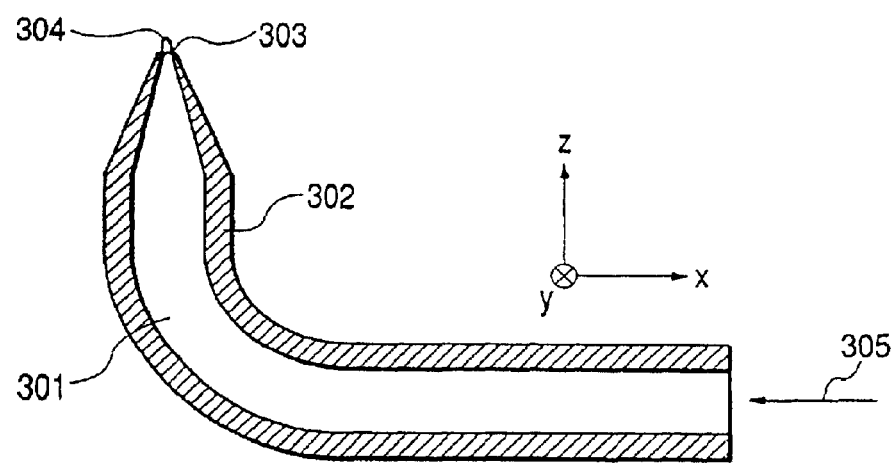

The aforementioned configuration provides a near field light having a much higher intensity than the conventional configuration. This comes from the inventor's knowledge as follows:

In order to explain the invention by contrasting the present invention and the prior art, FIGS. 3A and 3B illustrate a configuration of a conventional near field light probe, FIG. 3A being a top view of the probe and FIG. 3B being a cross-sectional view.

Referring to FIGS. 3A and 3B, an optical waveguide 301 is enclosed by a light-blocking film 302 and the light-blocking film 302 has a circular aperture 303 aligned with a sharply pointed tip of optical waveguide 301. As shown by arrow 305, light is coupled into the waveguide 301 from a side opposite from the circular aperture 303, so that a near field light 304 emanates from the circular aperture 303.

The near field light 304 spreads laterally (x-direction and y-direction in the figure) as wide as the size of the circular aperture 303 and longitudinally (z-direction in the figure) about 100 nm, which is less than the wavelength of the light. If the size of the circular aperture 303 is made smaller, the near field light 304 spreads in a narrower region, so that the resolution of the optical probe increases but at the same time the near field light emanating from the circular aperture 303 decreases in intensity.

Figure 4:
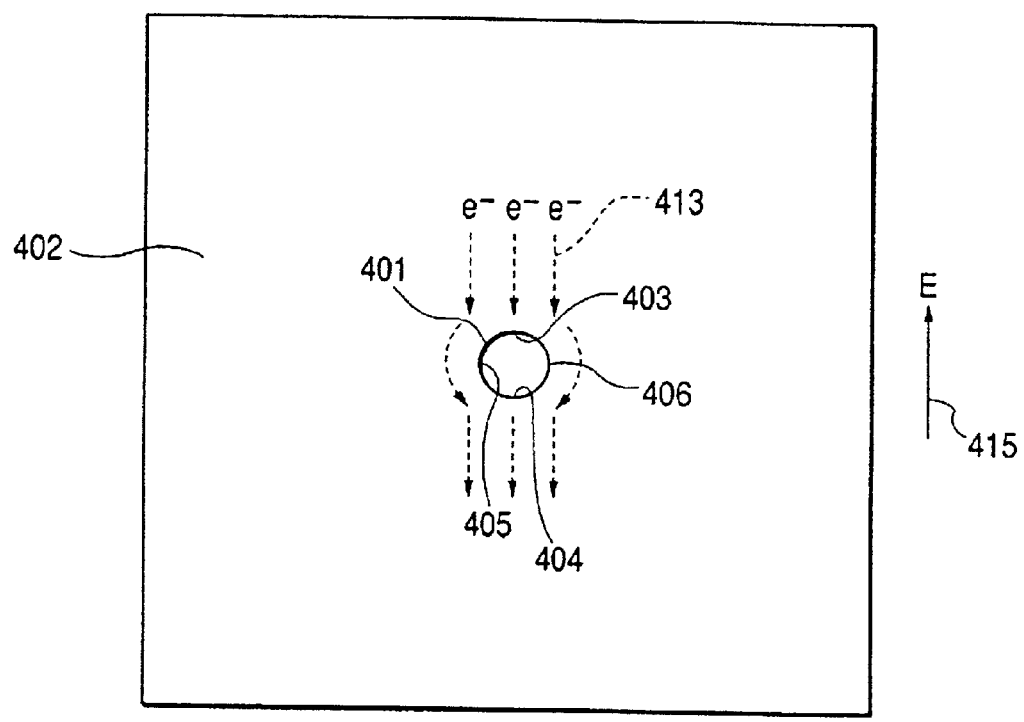
FIG. 4 illustrates the principle in which the prior art circular aperture produces near field light.

FIG. 4 illustrates the principle on which the near field light is generated at the circular aperture. Referring to FIG. 4, a light-blocking metal film 402 has a circular aperture 401 formed therein and light is incident on the light-blocking film 402 from the reader side. If the vector of electric field of the light at one moment is oriented as shown in FIG. 4, the free electrons on the surface of the metal receive forces from the electric field of the light to migrate in a direction opposite to that of the electric field of the light. The electrons reached an upper end 403 of the circular aperture 401 (FIG. 4) cannot move any further and stay where they are, so that the density of free electrons at the upper end 403 of the circular aperture 401 increases. In contrast to this, the density of free electrons at a lower end 404 of the circular aperture 401 decreases. For this reason, an electric field is developed across the upper end 403 and the lower end 404 in the same direction as that of the incident light. A portion of the thus created electric field penetrates to the other side of the circular aperture 401, becoming a near field light.

The free electrons at an upper left area of the circular aperture 401 receive forces from the electric field of the incident light, which is oriented in a direction shown by arrow 415 at one moment, to migrate along a left end portion 405 of the circular aperture 401 toward a lower left end of the circular aperture 401. Likewise, the free electrons at an upper right area of the circular aperture 401 receive forces from the electric field of the incident light migrate along a right end portion 406 of the circular aperture 401 toward a lower right end of the circular aperture 401. The free electrons migrated leftward and rightward, respectively, with respect to the line of force of the electric field of the light passing through the circular aperture 401, do not contribute to the production of the near field light that emanates to the other side of the circular aperture 401.

The light-blocking film of the near field light probe according to the present invention has an aperture comprised of a major opening and slits surrounding the major opening as opposed to a circular aperture of the conventional art probe. The principle on which the present invention operates will be described with reference to FIGS. 2 and 7 to 9. Arrows 213, 713, 813, and 913 represent the movement of the electrons on the surface of the light-blocking film. Arrows 214, 714, 814, and 914 represent the polarized direction of the incident light. Arrows 215, 715, 815, and 915 represent the orientation of the vector of electric field of light at one moment.

Figure 2:
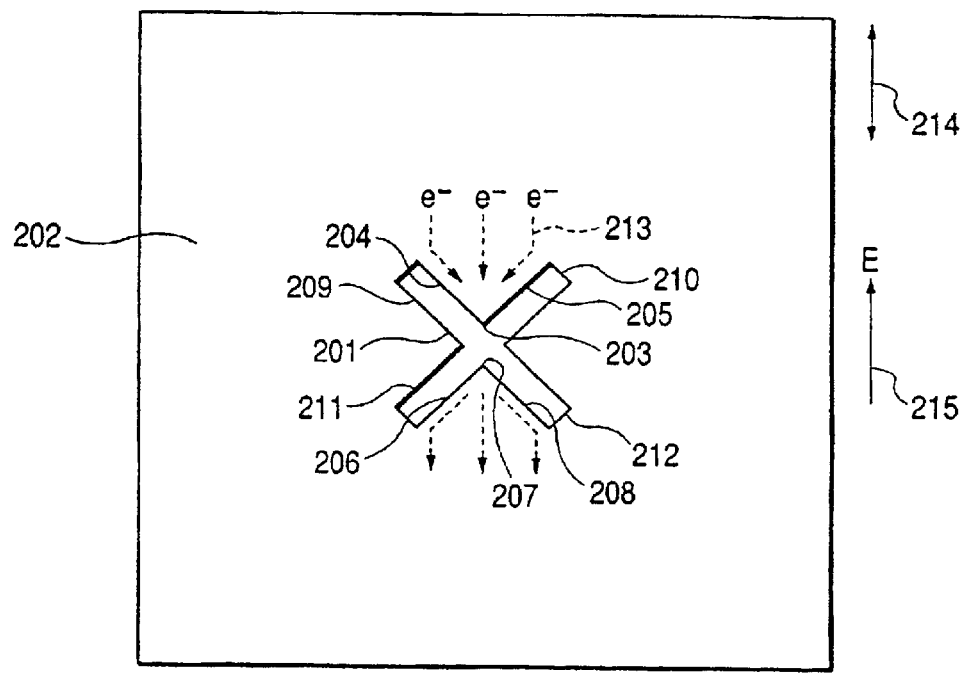
FIG. 2 illustrates the principle on which a near field light is emanated from the near field light probe having a light-blocking film that is formed with a cross-shaped aperture therein.

Referring to FIG. 2, a light-blocking metal film 202 has slits A–D (209–212) formed therein that form a cross-shaped aperture 201 as a whole. Light is incident from the reader's side. It is assumed that the orientation 214 or polarization of the incident light is at 45 degrees with the cross-shaped aperture 201. If the vector of electric field of the light at one moment is oriented in a direction 215 as shown in FIG. 2, the free electrons on the surface of the metal receive forces from the electric field of the light to migrate in a direction opposite to that of the electric field. The electrons reached an upper area 203 where the slits 209 and 210 cross each other (FIG. 2) cannot move any further and stay where they are.

The circular aperture shown in FIG. 4 suffers from the problem that the free electrons at locations on the upper left area and upper right area migrate along the left end portion of the aperture and the right end portion of the aperture, respectively, as shown by arrow 413. In contrast to this, the cross-shaped aperture 201 does not suffer from the problem that free electrons migrate along the left and right end portions of the aperture because of the presence of slits.

Referring to FIG. 2, the free electrons at an upper left area of the cross-shaped aperture 201 migrate along an upper left end portion 204 of the cross-shaped aperture 201 toward the upper middle area 203. Likewise, the free electrons at an upper right area of the cross-shaped aperture 201 migrate along an upper right end portion 205 of the cross-shaped aperture 201 toward the upper middle area 203. Therefore, the density of free electrons at the upper middle area 203 increases greatly compared with that of the prior art where the aperture is circular.

The free electrons at the lower left area 206, the lower middle area 207, lower right area 208 of the cross-shaped aperture 201 receive forces from the electric field of the light to migrate downward. As the free electrons migrate downward, the cross-sectional area of the migration path of the free electron increases, so that the free electrons migrate downward while spreading both leftward and rightward due to the Coulomb forces acting on the individual free electrons. Therefore, the density of free electrons at the lower middle area 207 decreases greatly compared with that of the prior art where the aperture is circular.

As a result, an electric field is created across the upper and lower middle areas 203 and 207 of the cross-shaped aperture 201 in the same direction as the electric field of the incident light. The thus created electric field is very high compared with that generated by the circular aperture of the conventional art. A portion of the thus created high electric field penetrates to the other side of the cross-shaped aperture 201, becoming a near field light having a very high intensity compared with that generated by the conventional circular aperture.

Figure 7:
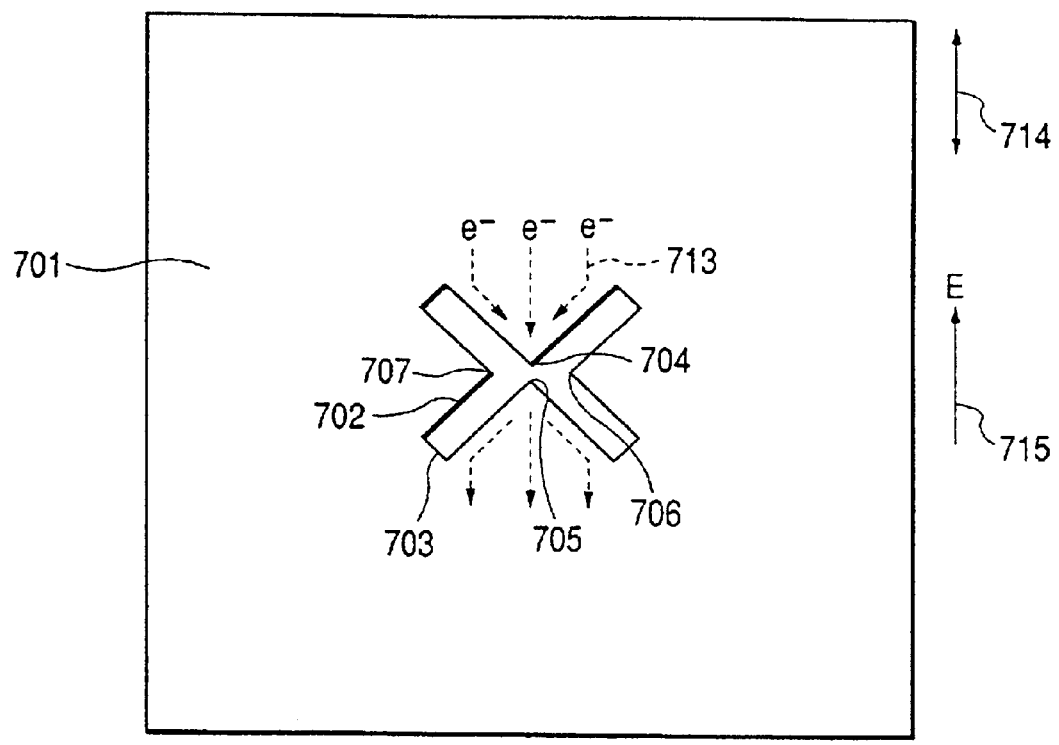
FIG. 7 illustrates the principle on which the near field light probe having a cross-shaped aperture generates near field light, the major opening being narrow in the direction in which the light is polarized.

With reference to FIG. 7, a description will be given of the principle on which the near field light increases in the cross-shaped aperture further if the slit extending in a direction parallel to the direction of the polarization (,i.e. the electric field vector oscillation direction) has a larger width than the slit extending in a direction perpendicular to the direction of the polarization.

Referring to FIG. 7, a cross-shaped aperture 702 is formed in a light-blocking film 701 and includes slits 703 that form two halves of the cross-shaped aperture 702 diagonally opposite with respect to the center of the cross-shaped aperture. Therefore, the distance between an upper middle area 704 and a lower middle area 705 is shorter than that between the right middle area 706 and the left middle area 707.

Thus, the electric field is created across the upper middle area 704 and the lower middle area 705 of the cross-shaped aperture 702 in the same direction as the electric field of the incident light. This created electric field is higher than that created by the cross-shaped aperture shown in FIG. 2, so that a near field light having higher intensity is generated.

Figure 8:
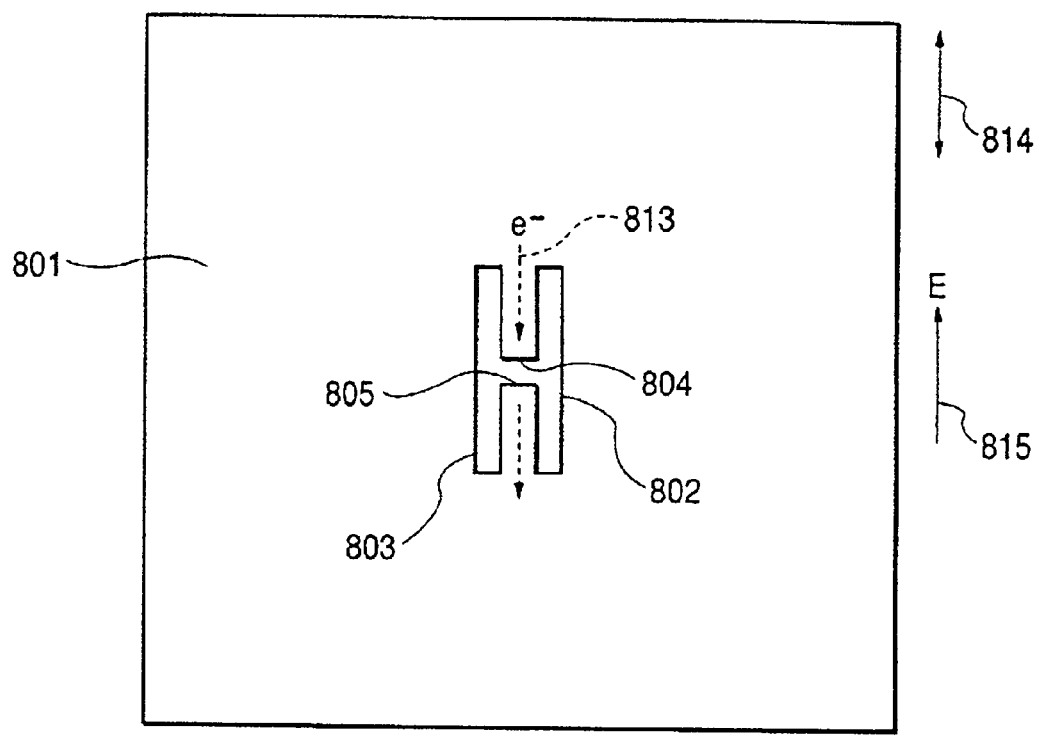
FIG. 8 illustrates the principle on which the near field light probe having an H-shaped aperture generate a near field light.

With reference to FIG. 8, a description will be given of other shapes of the aperture that are contemplated by the invention.

Referring to FIG. 8, a light-blocking metal film 801 is formed with slits 803 surrounding a major opening that form an H-shaped aperture as a whole. It is assumed that light is incident upon the light-blocking film 801 from the reader's side. The polarization of incident light is oriented in a direction parallel to vertical slits of the H-shaped aperture. If the vector of electric field of the light at one moment is oriented in a direction 815 as shown in FIG. 8, the free electrons on the surface of the metal receive forces from the electric field of the incident light to migrate in directions opposite to the electric field of the incident light. The electrons that reach an upper area 804 of the H-shaped aperture 802 (FIG. 8) cannot move any further and stay where they are.

In contrast to this, the free electrons at a lower middle area 805 receive forces from the electric field of the incident light to migrate in a direction opposite to the electric field of the incident light, leaving the lower middle area.

For this reason, an electric field is developed across the upper middle area 804 of the H-shaped aperture 802 and the lower middle area 805 in the same direction as that of the incident light. A portion of the thus created electric field penetrates to the other side of the H-shaped aperture 802, becoming a near field light.

The circular aperture shown in FIG. 4 suffers from the problem that the free electrons at the upper left area and upper right area migrate along the left end portion of the aperture and the right end portion of the aperture, respectively. In contrast to this, the H-shaped aperture 802 does not suffer from the problem that free electrons migrate along the left and right end portions of the aperture because there are slits. Therefore, an increase in the density of free electrons at an upper middle area 804 of the H-shaped aperture 802 and a decrease in the density of free electrons at a lower middle portion 805 are much larger than those of the circular aperture shown in FIG. 4. Thus, the H-shaped opening increases intensity of the near field light more than the circular aperture.

Figure 9:
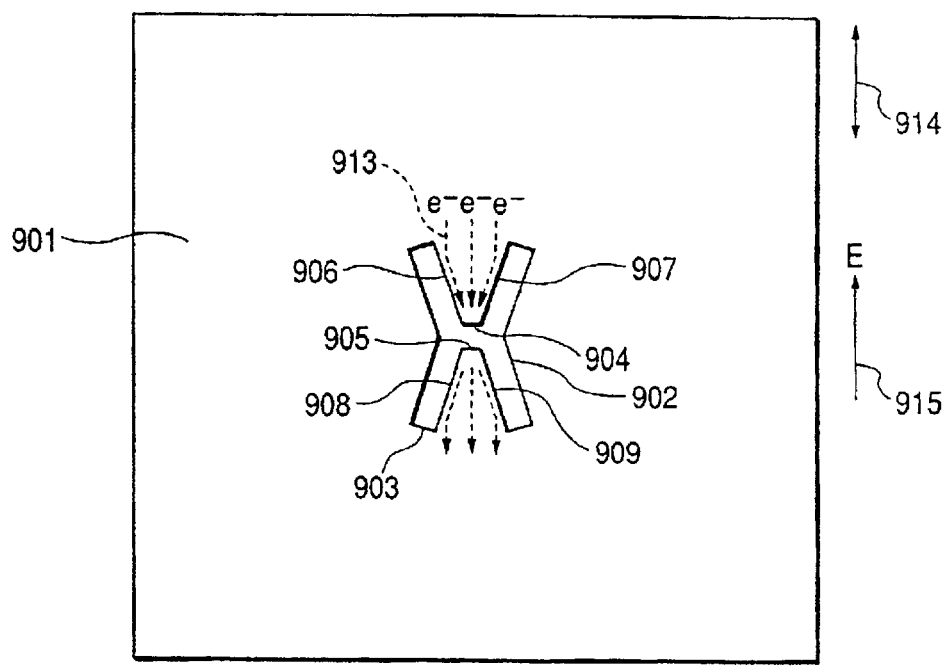
FIG. 9 illustrates the principle on which the near field light probe generates a near field light, the probe having an H-shaped aperture with slits that extend away from each other nearer the tip end thereof.

A description will now be given or the principle on which the near field light increases further if the slits of the H-shaped opening extend farther away from each other with increasing distance from the middle portion of the H-shaped opening with reference to FIG. 9. Referring to FIG. 9, a light-blocking film 901 has an H-shaped opening 902 formed therein. Slits 903 extend farther away from each other with increasing distance from the middle of the H-shaped aperture 902.

Thus, free electrons at an upper left area of the H-shaped opening 902 migrate along a left area 906 of the H-shaped opening 902 downward rightward toward an upper middle area 904. Free electrons at an upper right area of the H-shaped opening 902 migrate along a right end portion 907 of the H-shaped opening 902 downward leftward toward the upper middle area 904. Thus, an increase in the density of free electrons at the upper middle area 904 of the H-shaped opening 902 is more than that of the H-shaped opening of FIG. 8.

The free electrons at the lower left area 908, the lower middle area 905, lower right area 909 of the H-shaped opening 902 receive forces from the electric field of the light to migrate downward. As the free electrons migrate downward, the cross-sectional area of the migration path of the free electron increases, so that the free electrons migrate downward while spreading both leftward and rightward due to the Coulomb forces acting on the individual free electrons. Therefore, the density of free electrons at the lower middle area 905 decreases greatly compared with that of the prior art, with the H-shaped aperture of FIG. 8.

As a result, an electric field is created across the upper and lower middle areas 904 and 905 of the H-shaped opening 902 in the same direction as the electric field of the incident light. The thus created electric field is very high, compared with that generated by the circular aperture of the conventional art. A portion of the thus created high electric field penetrates to the other side of the H-shaped aperture 902, becoming a near field light having a very high intensity compared with that generated by the circular aperture of the conventional art.

Embodiments of the present invention will be described.

First Embodiment

Figure 1B:
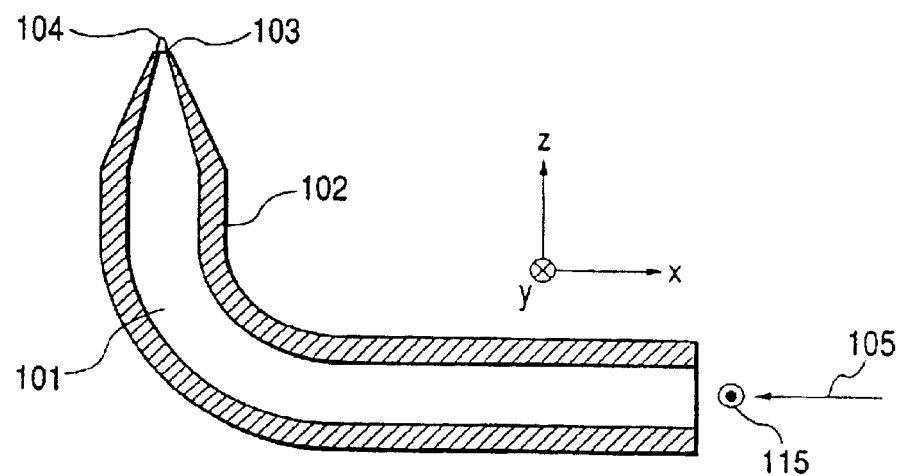

FIGS. 1A and 1B illustrate a configuration of a near field light probe according to a first embodiment, FIG. 1A being a top view of the probe and FIG. 1B being a cross-sectional view.

Referring to FIGS. 1A and 1B, an optical waveguide 101 is formed of a quartz optical fiber having a thickness of 20 μm with a sharply pointed end of a curvature of about 100 nm. The optical waveguide 101 is formed by chemical etching or drawing while heating. The optical waveguide 101 is coated with a light-blocking film 102 of a metal such as Al, Au, or Ag. The light-blocking film 102 has a thickness of 200 nm.

The metal light-blocking film 102 at the tip of the probe is exposed to a focused Ga ion beam to form a cross-shaped aperture 103 such that two narrow slit-shaped openings cross each other at middle portions thereof, each opening having a length of 500 nm and a width of 30 nm. (In this connection, the overlapped portion of the two slit-shaped openings corresponds to the major opening.) The cross-shaped aperture 103 may be formed by other methods than the focused ion beam (FIB) method. Such methods include electron beam and scanning-type probe microscope (SPM).

As shown by arrow 105, a beam of light of 500 nm and 1 mW is coupled into the optical waveguide 101 on a side opposite from the cross-shaped aperture 103. The beam of light is polarized in such a direction 115 that the polarization of the light is at an angle of 45 degrees with the cross shape of the aperture 103. In this manner, a near field light 104 emanates from the cross-shaped aperture 103. It is assumed that the incident light is polarized in a y-direction and reflected inside the optical waveguide 101 to reach the cross-shaped aperture 103. The light illuminates the cross-shaped aperture 103 from inside the optical waveguide 101.

The near field light 104 spreads laterally (x-direction and y-direction in the figure) by an area substantially equal to a crossing area of the cross-shape of the aperture 103, i.e., about 30 nm, and longitudinally (z-direction in the figure) by less than the wavelength of the light, i.e., about 100 nm. The generated near field light 104 changes in intensity greatly depending on the distance between the near field light probe and the object to be observed, and therefore, it is difficult to evaluate the performance of the probe accurately. The intensity of scattered light of near field light was 100 nW, which is one measure of the performance of the probe. This is more than 100 or more times that of a near field light probe having a conventional circular aperture of substantially the same size as the present invention.

Narrowing the width of one of the two crossing slit shaped openings of the cross-shaped aperture 103 will cause the near field light to spread laterally in a narrower area, increasing the resolution of the optical probe.

The near field light probe according to the embodiment has been described with respect to a type in which an optical waveguide having a cross-shaped aperture formed at a tip of the probe is bent. The optical waveguide is bent because, as described later, when the near field light probe is incorporated into microscopes, machining apparatus, and storage apparatus, the principle of an atomic force microscope (AFM) is used to control the distance between the probe and the object to be observed. Thus, the bent shape of the waveguide 101 is not essential and the waveguide 101 may be straight when shear force distance control method is employed.

Second Embodiment

Figure 5:
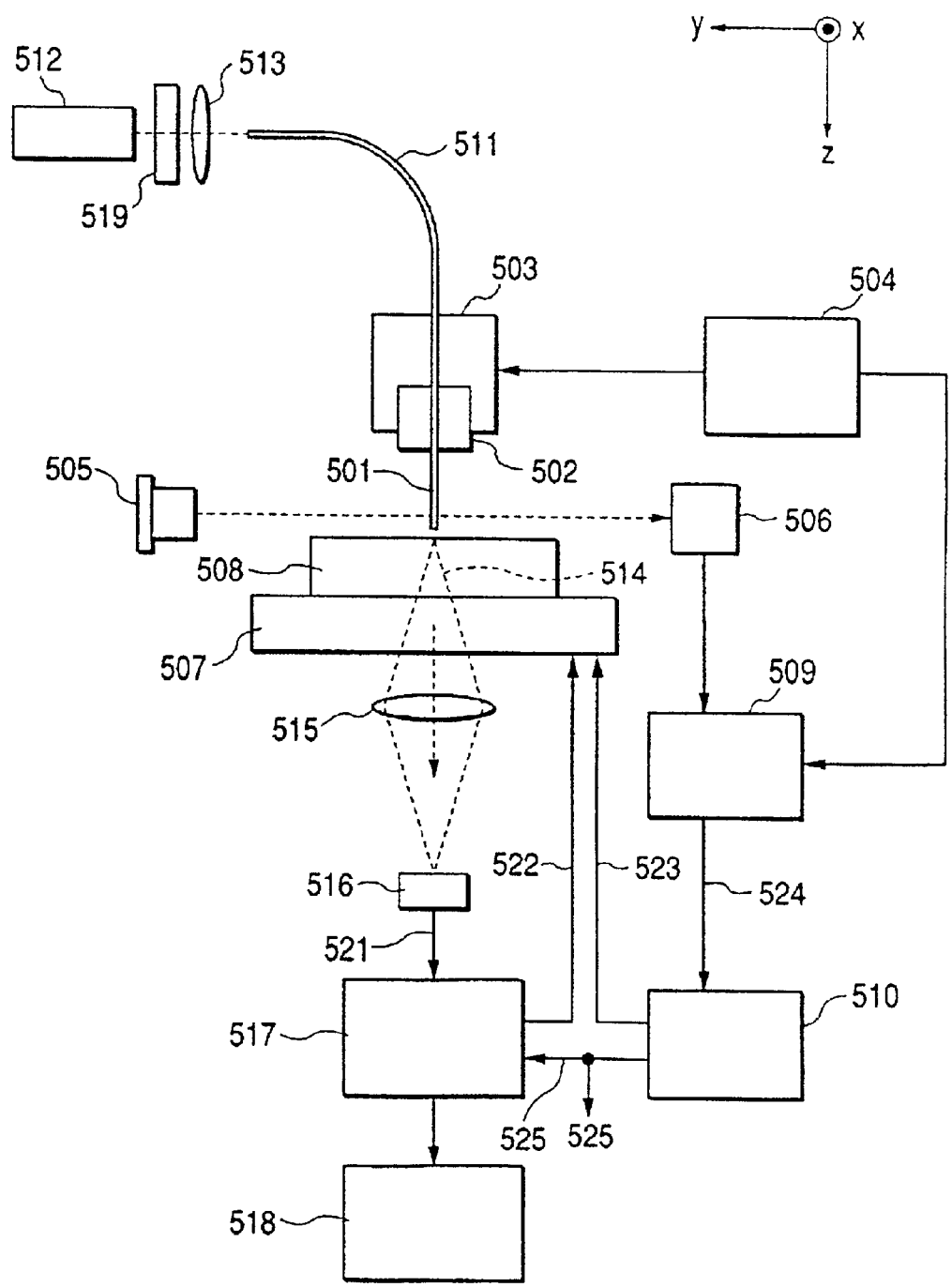
FIG. 5 illustrates a configuration of a near field optical microscope that employs the near field light probe having a cross-shaped aperture according to a second embodiment of the invention.

A second embodiment is characterized by a shear-force distance control-type near field optical microscope as shown in FIG. 5 that employs the near field light probe of the configuration of the first embodiment.

Referring to FIG. 5, a probe supporting substrate 502 supports a near field light probe 501 having a cross-shaped aperture. The substrate 502 is mounted on a piezoelectric element 503 and a function generator 504 provides a sinusoidal signal to the piezoelectric element 503 so that the piezoelectric element 503 oscillates in an x-direction of FIG. 5. If the sinusoidal signal is set to the resonance frequency at which the near field light probe 501 deforms in the x-direction, the near field light probe 501 resonates at the same frequency. Then, a laser beam emitted from a laser source 505 in the y-direction illuminates the near field light probe 501 near the tip of the probe 501. A two-division sensor 506 detects a change in the position of the spot of a beam transmitted through the probe 501. Based on a difference signal outputted from the two-division sensor 506, a signal representative of the amount of oscillation of the tip of the near field light probe 501 is generated.

An object 508 to be observed placed on an xyz stage 507 is moved close to the near field light probe 501 until the distance between the object and the tip of the near field light probe 501 is 100 nm or less. At this moment, a shear force (van der Waals force) acts between the tip of the near field light probe 501 and the object 508 to be observed to reduce the amplitude of oscillation of the tip of the near field light probe 501. A lock-in amplifier 509 detects the amplitude of the oscillation based on the difference signal of the two-division sensor 506 and the reference signal outputted from the function generator 504, and provides a shear force signal 524 to a distance-controlling circuit 510. The distance controlling circuit 510 feedback-controls the xyz stage 507 in the z-direction in such a way that the shear force signal becomes constant. In FIG. 5, reference numeral 522 denotes an xy-drive signal and reference numeral 523 denotes an x-drive signal. An z-direction feedback control signal is inputted as a shape signal 525 representative of the surface of the object to be observed into a computer 517.

A laser 512 generates laser light. The laser light in turn is transmitted through a polarizer 519 and then a condenser lens 513 into an optical fiber 511 connected to the near field light probe 501, thereby generating a near field light from a minute aperture formed in the tip of the near field light probe 501. The near field light is scattered on the surface of the object to be observed. The scattered light 514 is gathered by the condenser lens 515 and a photomultiplier 516 detects the gathered light. The near field light signal outputted from the photomultiplier 516 is inputted into the computer 517.

The computer 517 provides an xy direction scanning signal to the xyz stage 507, so that the magnitudes of a near field light signal 521 and a shape signal are mapped on a display 518 in accordance with the position of the tip of the near field light probe 501 relative to the object 508 to be observed, thereby providing both an image of a near field optical microscope and an image of a shear force (atomic force) microscope simultaneously.

Third Embodiment

Figure 6:
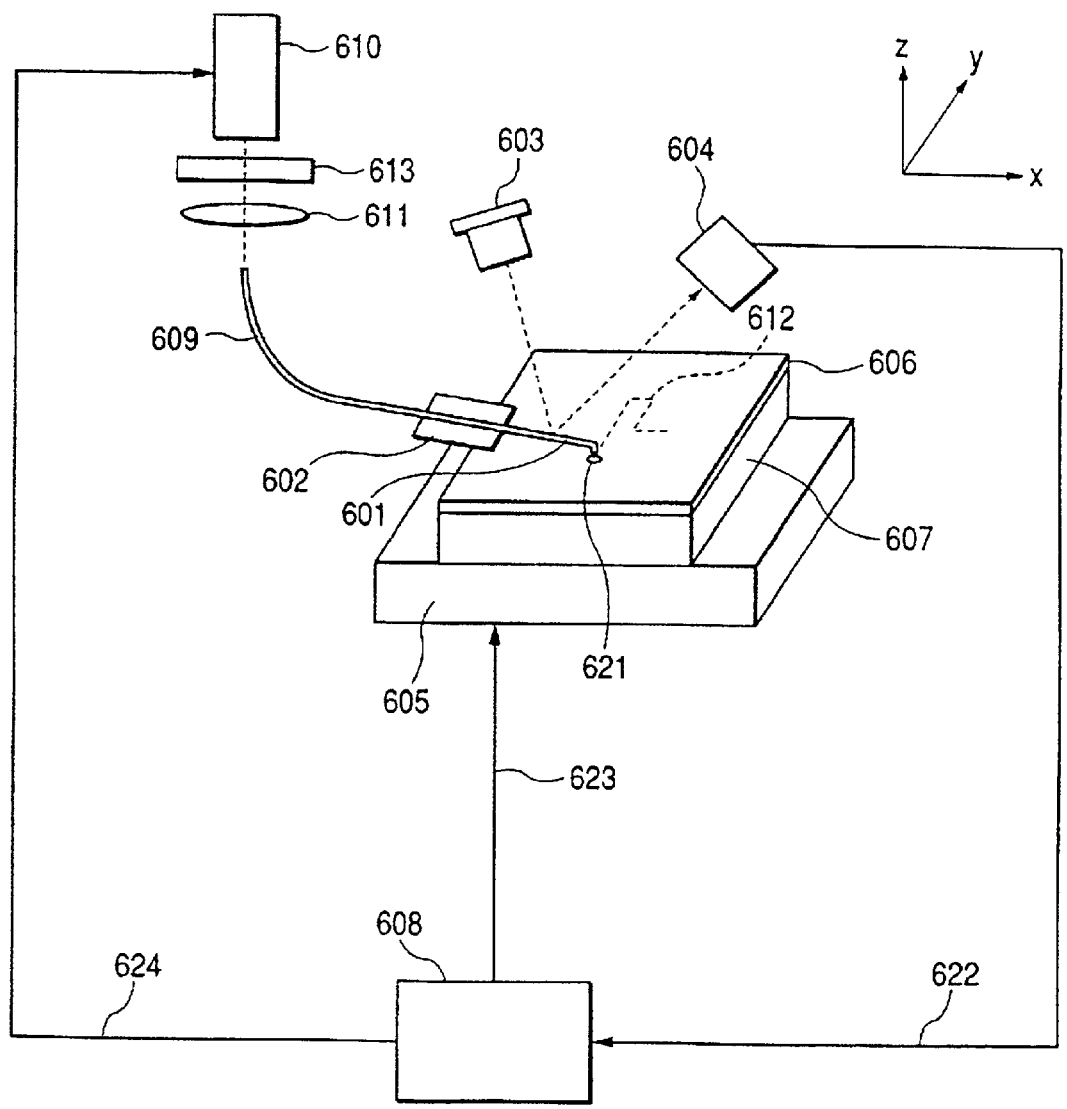
FIG. 6 illustrates a configuration of a near field light scanning micromachining apparatus that employs the near field light probe having a cross-shaped aperture according to a third embodiment of the invention.

A third embodiment employs the near field light probe of the first embodiment to configure a near field light probe scanning machining apparatus of contact AFM distance control type as shown in FIG. 6.

Referring to FIG. 6, a near field light probe 601 has a cross-shaped aperture and is mounted to a probe supporting substrate 602. A laser 603 is coupled to the rear of the probe 601 toward the tip of the probe 601 and a change in the spot position of reflected beam is detected by the two-division sensor 604. The difference signal of the two-division sensor 604 is an AFM signal indicative of an amount of flexure of the tip of the near field light probe 601 in the z-direction and is inputted into the computer 608.

The xyz stage 605 is driven in the z-direction to bring the tip of the near field light probe 601 close to the surface of a resist 606 so that the a van der Waals force of less than $10^{-7}$ [N] acts on the surface of the resist 606 on the substrate 607 mounted on the xyz stage 605. Then, the computer 608 outputs an xyz stage drive signal 623 to move the xyz stage 605 in a two-dimension defined by the x-direction and y-direction.

The computer 608 performs mapping of the size of AFM signal 622 based on the xy-direction drive signal for the xyz stage 605, thereby providing the surface shape of the resist 606. Using this information, the tip of the near field light probe 601 can be positioned relative to the resist 606, i.e., the substrate 607.

A laser 610 generates laser light. The laser light in turn is transmitted through a polarizer 613 and then a condenser lens 611 into an optical fiber 609 connected to the near field light probe 601, thereby generating a near field light 621 from a minute aperture formed in the tip of the near field light probe 601.

When the tip of the near field light probe 601 is brought close to the surface of the resist 606 so that a van der Waals force of less than $10^{-7}$ [N] acts between the probe 601 and the resist 601, the distance between the probe 601 and the resist 601 is 100 nm or less and the near field light has a sufficiently high intensity.

When the tip of the near field light probe 601 is placed in position relative to the resist 606 and the substrate 607 in accordance with the xy drive signal for the xyz stage 605 outputted from the computer and the AFM signal, the computer provides a laser control signal 624 to a laser 610 to control the on and off control of illumination of the laser 610, i.e., to form a pattern 612 on the resist 606. The process from this stage onward is the same as a usual semiconductor process.

The third embodiment has been described with respect to a near field optical microscope and machining apparatus to which the near field light probe having a cross-shaped aperture formed in the tip thereof is applied. In addiction, the configurations of the near field optical microscope and machining apparatus may be combined to configure a storage apparatus that performs microscopic observation, i.e., reproduction of the bits recorded on a recording medium.

Fourth Embodiment

Figure 10A:
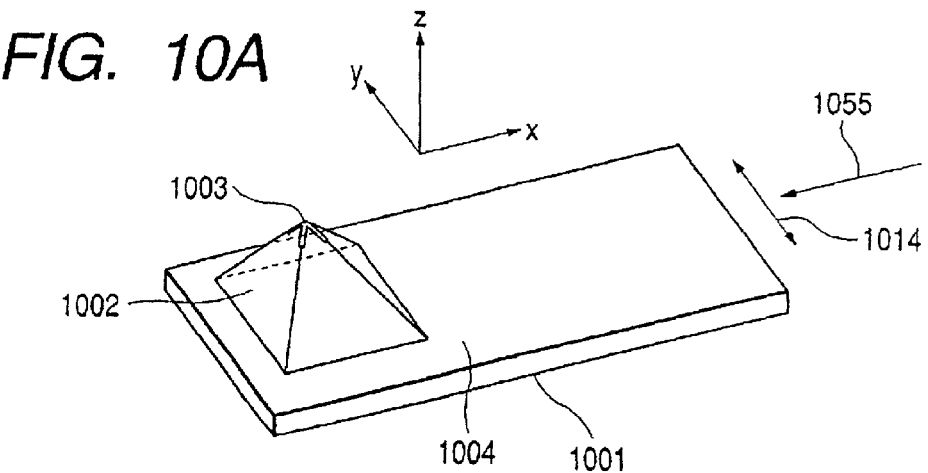
FIGS. 10A, 10B and 10C illustrate the configuration of a near field light probe according to a fourth embodiment.
Figure 10B:
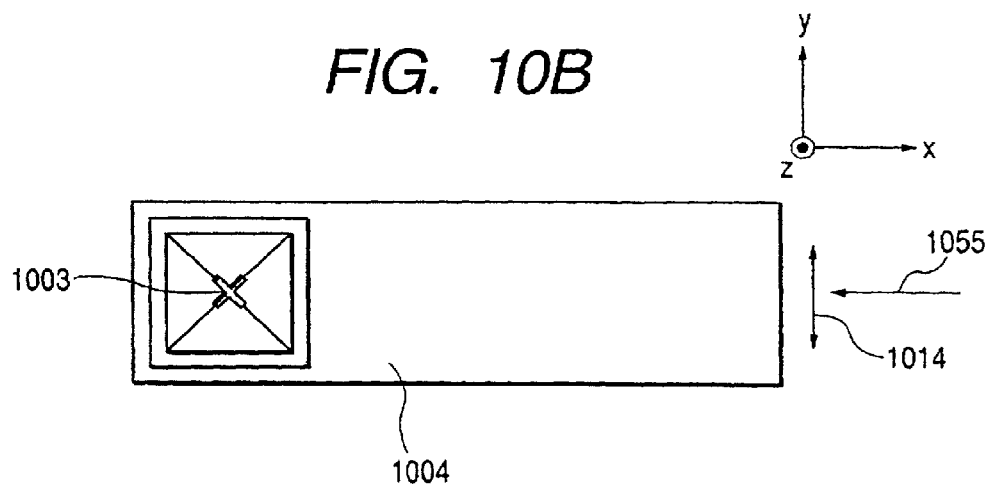
Figure 10C:
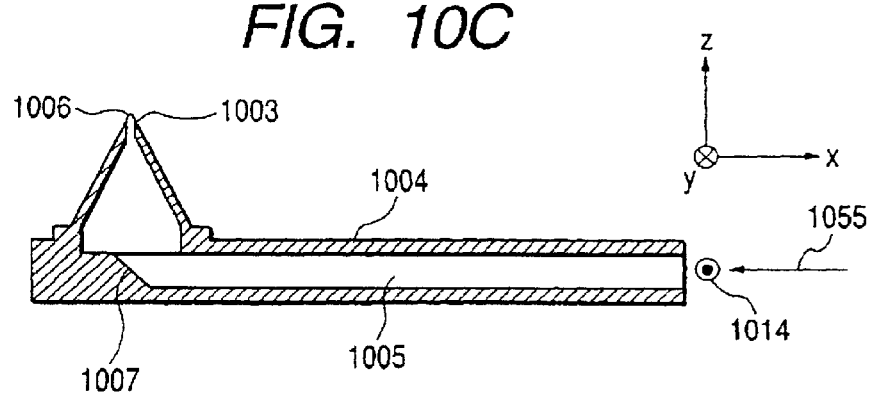

FIGS. 10A, 10B, and 10C show other configurations of the near fold light probe according to the present invention, FIG. 10A being a perspective view of the probe, FIG. 10B being a top view, and FIG. 10C being a cross-sectional view.

Referring to FIGS. 10A to 10C, a pyramid-shaped probe 1002 is provided on a cantilever 1001 and a light-blocking film 1004 covers the pyramid-shaped probe 1002 and cantilever 1001. The light-blocking film 1004 has a cross-shaped aperture 1003 having slits aligned with the edges of the pyramid-shaped probe 1002.

An optical waveguide 1005 is formed in the cantilever 1001 covered with the light-blocking film 1004. As shown by arrow 1055, a beam of light is coupled into the optical waveguide 1005 on a side opposite from the cross-shaped aperture 1003. The beam of light is polarized in such a direction shown by arrow 1014 that the polarization of the light is at an angle of about 45 degrees with the cross-shape of the aperture 1003. Thus, a near field light 1006 emanates from the cross-shaped aperture 1003 formed in the tip of the probe. Here, the incident light is polarized in the y-direction of FIG. 10 and is reflected by a mirror 1007 formed on an end of the optical waveguide, so that the light polarized in the y-direction illuminates the cross-shaped aperture 1003 from the backside as shown in FIG. 10B.

Such a near field light probe is manufactured by micromachining techniques disclosed in detail in Japanese Patent Application Laid-Open Nos. 10-293134, 11-064350, and 11-066650. The aperture in the tip of the probe 1002 can be formed by, for example, FIB, EB, and SPM as mentioned in the first embodiment. Alternatively, as mentioned in these publications, when dry etching is performed from the z-direction to form an aperture, the time for dry etching is prolonged so that the edges of the pyramid are etched away to form a cross-shape aligned with the edges of the pyramid.

The thus manufactured near field light probe can be applied, just like the near field light probe according to the first embodiment, to a near field optical microscope, a near field light lithography apparatus, and a near field light storage apparatus described in the second and third embodiments.

Fifth Embodiment

Figure 11A:
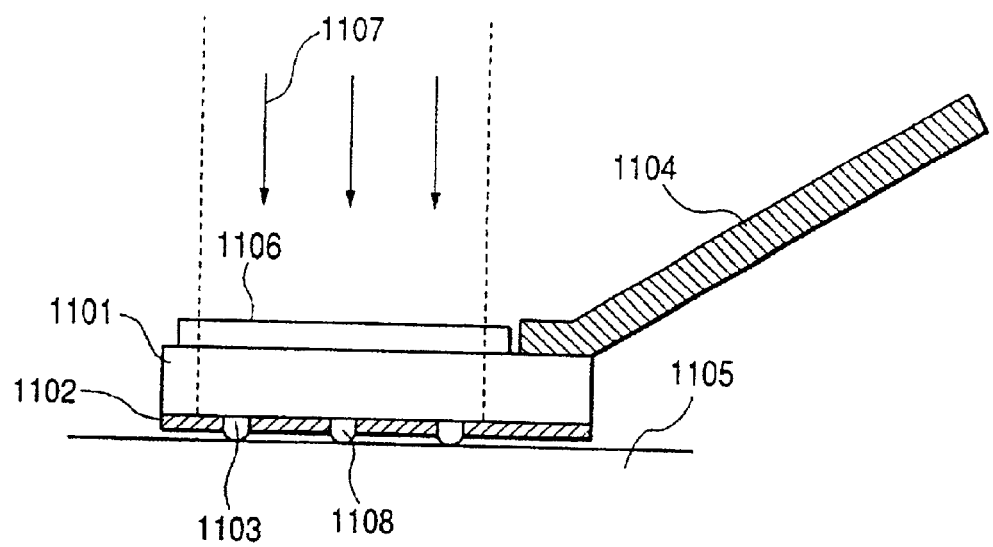
FIGS. 11A and 11B illustrate a configuration of a near field light probe according to a fifth embodiment of the invention.
Figure 11B:
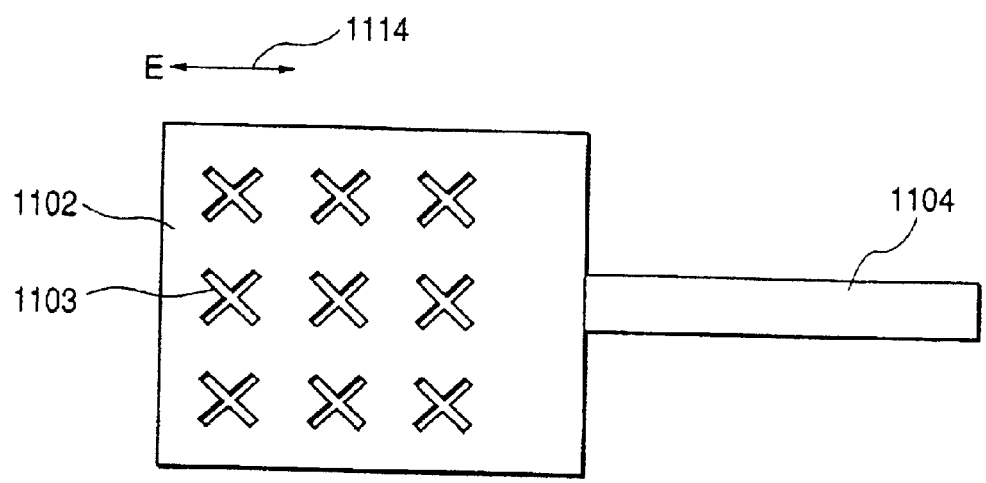

FIGS. 11A and 11B illustrate other configurations of the near field light probe according to the present invention,
FIG. 11A being a side view of the probe and FIG. 11B being a view seen from the bottom.

Referring to FIGS. 11A and 11B, a flat light-blocking film 1102 is provided under a transparent substrate 1001. The light-blocking film 1102 is formed with a plurality of cross-shaped apertures 1103. There is provided a polarizer plate 1106 on the transparent substrate 1101. Light 1107 is incident the polarizer plate 1106 from above to couple the light into the transparent substrate, the light being polarized substantially in a direction shown by arrow 1114 at about 45 degrees with the cross-shape of the cross-shaped aperture 1103. Thus, a near field light 1108 emanates from the underside of the plurality of cross-shaped apertures 1103.

A suspension arm 1104 supports the near field light probe in which a near field light emanates from a plurality of apertures 1103 and moves a recording medium 1105 relative to the suspension arm 1104, thereby allowing recording or reproducing of information on a desired position on the recording medium 1105.

The first to fifth embodiments have been described with respect to a cross-shaped aperture, the invention is also applicable to the cross-shaped aperture of FIG. 7 in which two halves of the cross-shaped aperture are diagonally opposite with respect to the center of the cross-shaped aperture, and to the cross-shaped aperture of an H-shape of FIGS. 8 and 9.

As described above, the present invention provides a near field light probe that can emanate a near field light with a sufficient intensity while allowing miniaturizing of the aperture to improve resolution. Thus, incorporating this type of near field light probe in a near field optical microscope will not deteriorate the SN ratio of a detection signal even if the resolution is improved, and shortens the time required for observation of an object under a microscope.

A machining apparatus employing this optical probe does not reduce the amount of light transmitted through an object but shortens the time required for machining while allowing reduction of the aperture size for micro-fabrication and therefore improving throughput. Likewise, an optical storage apparatus that employs this optical probe allows high speed recording and reproducing while allowing reduction of the aperture size to increase recording capacity.

What is claimed is:

1. A near field light probe wherein a light-blocking film has an aperture comprised of a major opening and slits surrounding the major opening, and light emitted from a light source and polarized in a specific direction of oscillation of an electric field vector comes into the aperture from one side of the light-blocking film, whereby a near field light usable for probing emanates from the major opening, wherein the aperture is substantially H-shaped, the bar of which H-shape is the major opening, and the light polarized in the specific direction of the oscillation of the electric field vector is a light polarized in the longitudinal direction of the H-shape.

2. The near field light probe according to claim 1, wherein each of the slits has a width substantially at most the same as a dimension of the major opening.

3. The near field light probe according to claim 1, wherein the slits that form the H-shape are located so as to make the distance between two of the slits adjacent to each other increase with an increasing of a distance from the center of the H-shape.

4. A near field light probe wherein a light-blocking film has an aperture comprised of a major opening and slits surrounding the major opening, and light emitted from a light source and polarized in a specific direction of oscillation of an electric field vector comes into the aperture from one side of the light-blocking film, whereby a near field light usable for probing emanates from the major opening, wherein the aperture is provided at a sharply pointed tip portion of an optical waveguide covered with the light-blocking film, with the tip portion having a shape of a pyramid, and the slits are substantially aligned with edges of the pyramid.

5. The near field light probe according to claim 1, wherein the light-blocking film is flat and the aperture is formed in the light-blocking film.

6. The near field light probe according to claim 5, wherein a plurality of the apertures are formed in the light-blocking film.

7. The near field light probe according to claim 1, wherein the probe is provided on an elastic body.

8. A near field optical microscope incorporating the near field light probe according to claim 1.

9. A near field light lithography apparatus incorporating the near field light probe according to claim 1.

10. A near field light storage apparatus incorporating the near field light probe according to claim 1.

11. A near field light generating method comprising the following steps:

preparing a probe comprising a light-blocking film having an aperture comprised of a major opening and slits surrounding the major opening;

polarizing a light emitted from a light source in a specific direction of oscillation of an electric field vector;

irradiating the polarized light into the aperture from one side of the light-blocking film such that (i) the longitudinal direction of slits are either parallel to or at an acute angle with the specific direction of the oscillation of the electric field vector, and (ii) (a) free electrons at the surface of the light-blocking film at one side of the major opening migrate towards the major opening and (b) free electrons at the surface of the light-blocking film at the other side of the major opening migrate away from the major opening, and an electric field is created by utilizing the migrated electrons in the same direction as the electric field of the irradiated light; and penetrating a portion of the created electric field to the other side of the aperture to become a near field light having a high intensity compared with that generated by the major opening only.

* * * * *

UNITED STATES PATENT AND TRADEMARK OFFICE
CERTIFICATE OF CORRECTION

PATENT NO.  : 6,785,445 B2
DATED       : August 31, 2004
INVENTOR(S) : Ryo Kuroda et al.

It is certified that error appears in the above-identified patent and that said Letters Patent is hereby corrected as shown below:

<u>Column 1,</u>
Line 56, "aperture," should read -- aperture --.

<u>Column 2,</u>
Line 58, "as to make" should read -- that -- and
Line 59, "increasing" should read -- an increase in --.

<u>Column 5,</u>
Line 6, "allows" should read -- allow --.

<u>Column 8,</u>
Line 8, "left ward" should read -- and leftward --.

<u>Column 12,</u>
Line 8, "incident" should read -- incident upon --.

Signed and Sealed this

Twenty-ninth Day of March, 2005

JON W. DUDAS
*Director of the United States Patent and Trademark Office*